United States Patent

Scaramucci

[15] 3,705,707

[45] Dec. 12, 1972

[54] SELF-ALIGNING TRUNNION BALL VALVE

[72] Inventor: Domer Scaramucci, 3245 S. Hattie, Oklahoma City, Okla. 73129

[22] Filed: July 13, 1971

[21] Appl. No.: 162,224

[52] U.S. Cl. ............... 251/84, 137/315, 251/152, 251/174, 251/315, 251/316
[51] Int. Cl. ............... F16k 5/06
[58] Field of Search ........ 137/315; 251/84, 149, 151, 251/152, 174, 314, 315, 316

[56] References Cited

UNITED STATES PATENTS

| | | | |
|---|---|---|---|
| 2,734,715 | 2/1956 | Knox | 251/84 X |
| 3,269,692 | 8/1966 | Shafer | 251/315 X |
| 3,277,919 | 10/1966 | Piccardo | 137/315 |
| 3,599,933 | 6/1971 | Piccardo | 251/174 X |

*Primary Examiner*—Harold W. Weakley
*Attorney*—Dunlap, Laney, Hessin & Dougherty

[57] ABSTRACT

A ball valve in which the spherical valve member is rotatably supported in the valve body by two bearing members slidably disposed therein. Each bearing member rotatably receives a respective journal member formed on the valve member. The two bearing members and the valve member supported thereby are adapted to move axially within the valve body during operation of the valve to provide proper alignment of the valve member in the valve body. Means are also disclosed for providing proper radial alignment of the valve member in the valve body.

17 Claims, 7 Drawing Figures

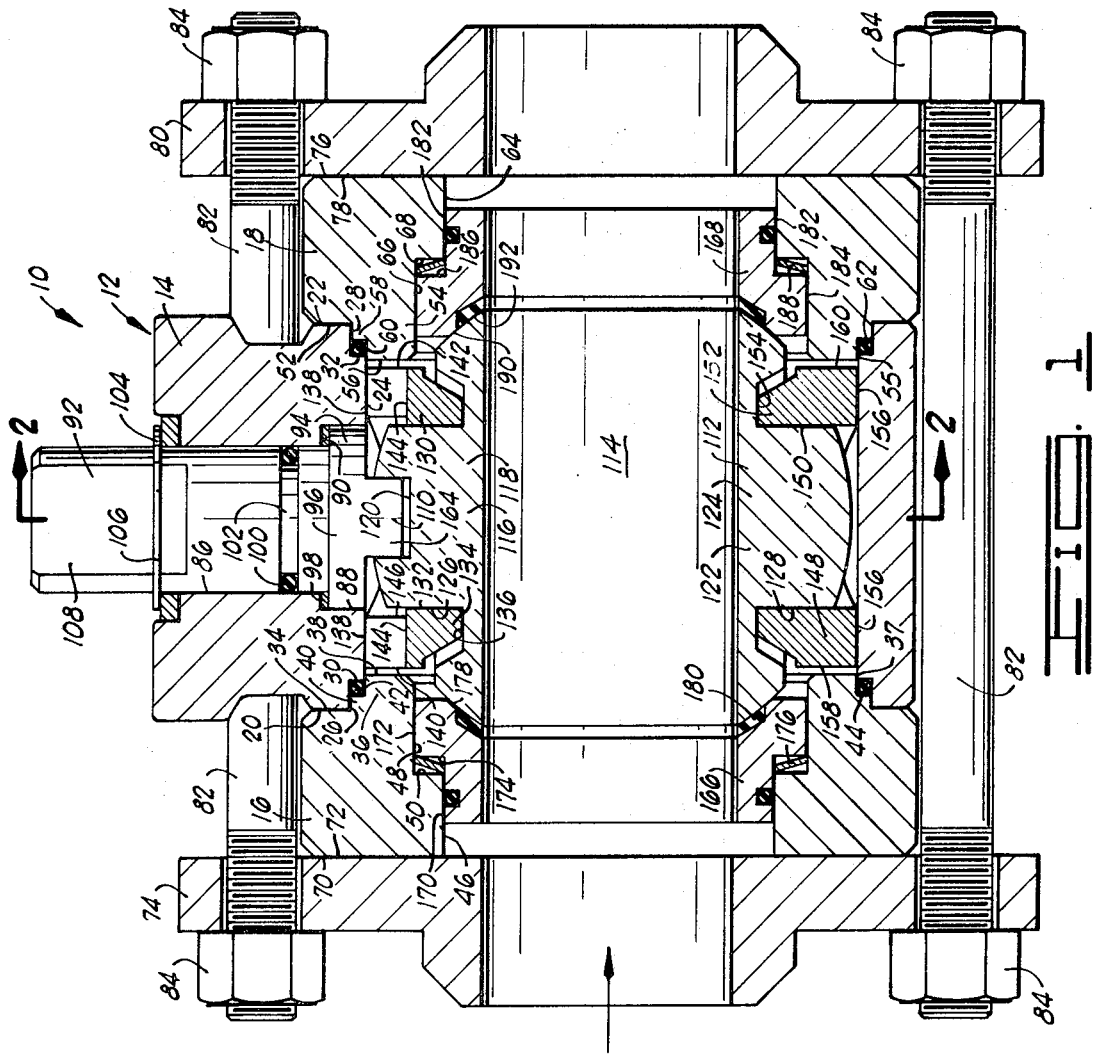
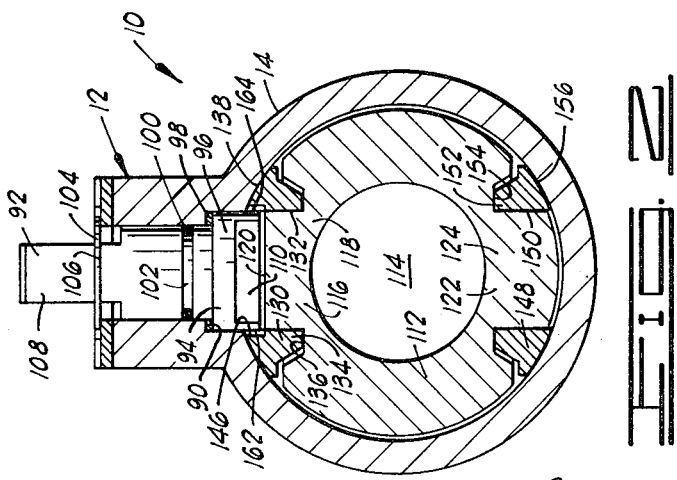

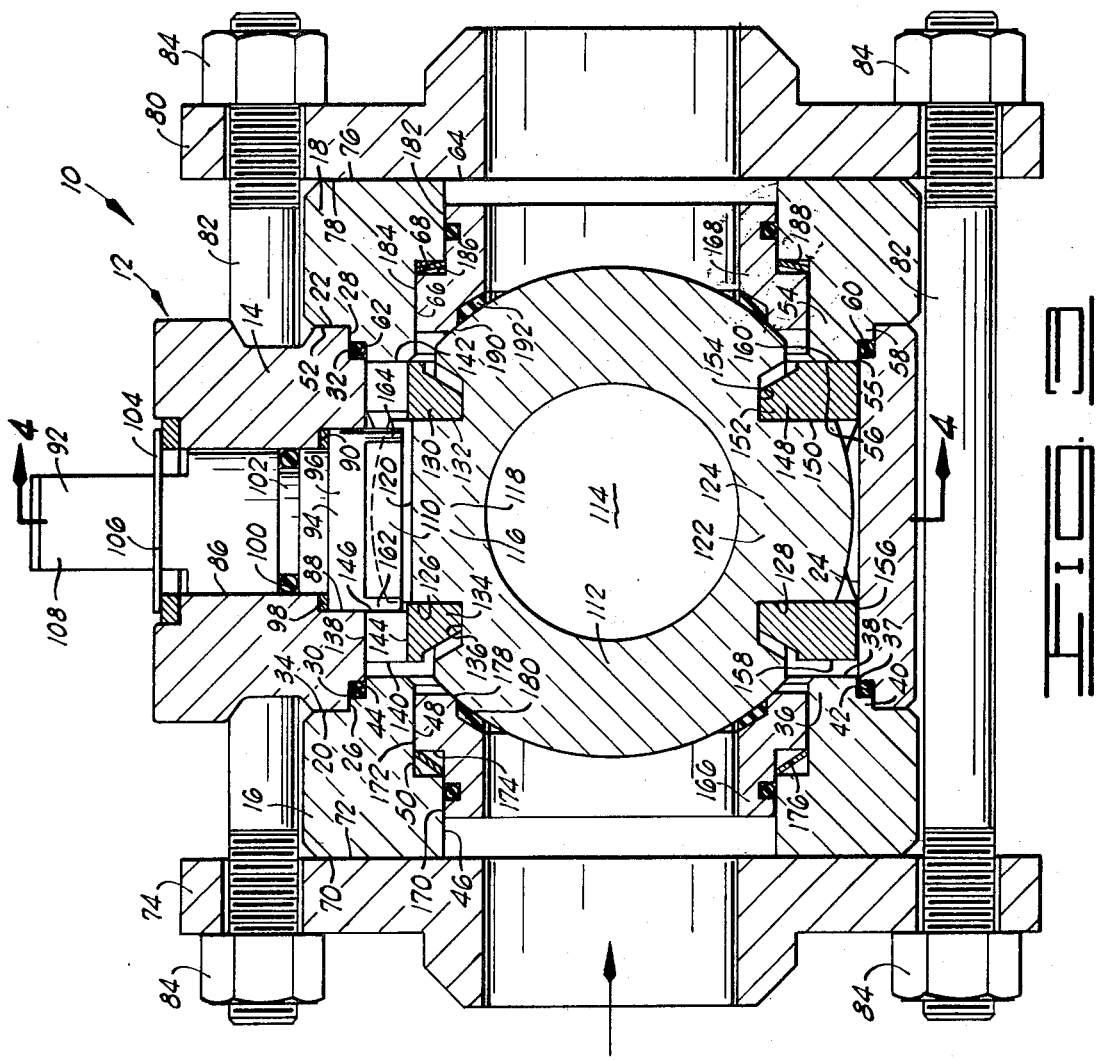
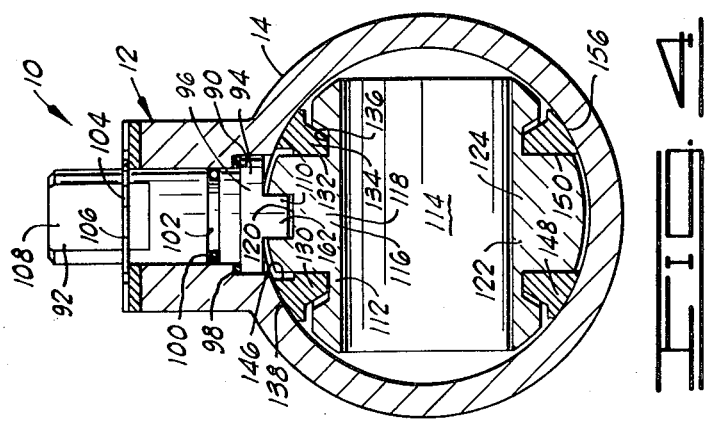

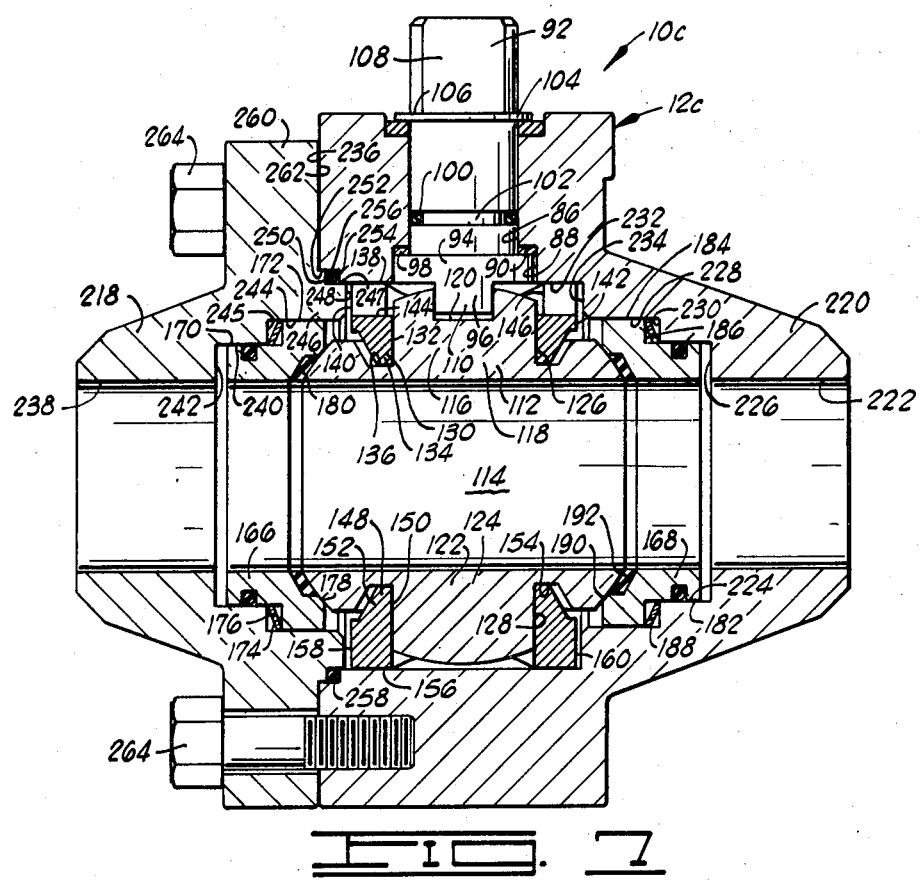
FIG. 7
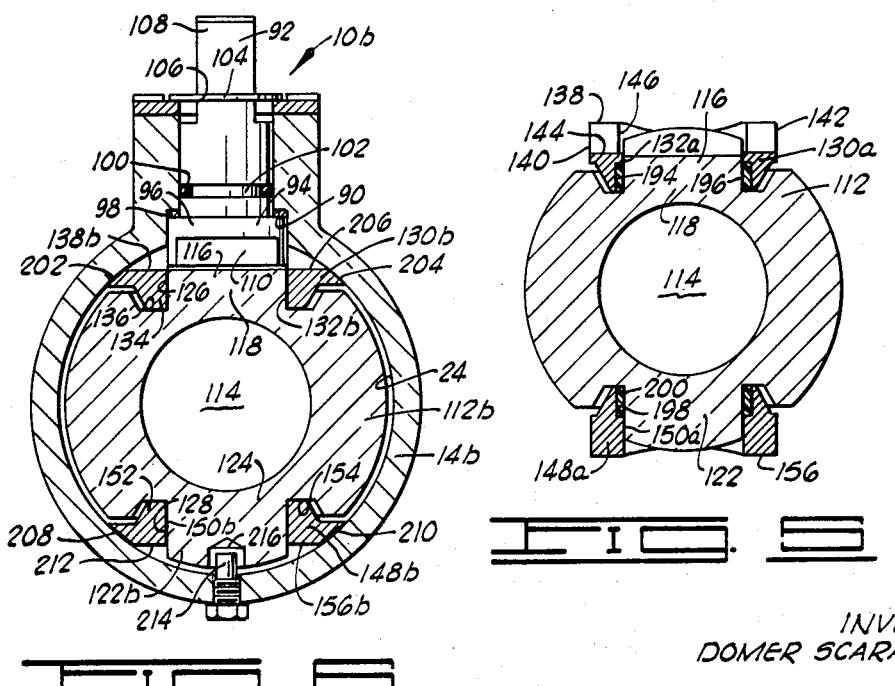
FIG. 6
FIG. 8
INVENTOR
DOMER SCARAMUCCI
ATTORNEYS

SELF-ALIGNING TRUNNION BALL VALVE

BACKGROUND OF THE INVENTION

1. Field of the Invention

This invention relates generally to improvements in valves, and more particularly, but not by way of limitation, to ball valves wherein the spherical valve member is rotatably supported within the valve body by means of trunnions formed on the valve member and bearing blocks or the like in which the trunnions are rotatably received.

2. Description of the Prior Art

The prior art contains numerous examples of ball valves in which the spherical valve member is rotatably supported within the valve body by means of trunnions formed on the valve member and journaled in bearing blocks rigidly secured to the interior of the valve body. From a manufacturing standpoint, this type of ball valve is difficult and expensive to build. Also, disassembly of the prior art trunnion type ball valves to replace seals or the valve member itself requires considerable effort and time because of the care required in precisely aligning the component parts of the valve upon reassembly.

In those prior art trunnion type ball valves wherein the valve stem is rigidly secured to the spherical valve member, extreme care must be exercised during the manufacture of the valve. It is necessary that the stem bore centerline be equidistant from the body end faces. It is further necessary that the body stem bore centerline and the trunnion bearing block centerlines be coaxial thus requiring extremely precise machining of the valve parts and great care in their assembly.

From the standpoint of service, misalignment of the stem bore centerline and the trunnion bearing block bore centerlines creates stress and binding of the stem and valve member trunnions thereby increasing the torque requirements for valve operation and accompanying accelerated valve wear. Another disadvantage of the prior art trunnion type ball valves is that pressure and piping stresses create or aggravate existing misalignment conditions causing further acceleration of trunnion bearing wear. This trunnion bearing wear presents an additional problem in that the rigid stem connection is required to bear an increasing amount of thrust loading on the valve member thereby imposing sheer stress on the stem connection and causing accelerated stem and stem seal wear.

Certain of the prior art trunnion type ball valves utilize some form of synthetic resin bearing sleeves to support the valve member trunnions. Exposure of such valves to excessive heat due to fire can destroy such sleeve bearings imposing high thrust loads on the stem connection to the closed valve member. Under these conditions the valve member is biased and cannot provide a satisfactory seal at the valve seats.

SUMMARY OF THE INVENTION

The present invention contemplates an improved trunnion type valve which includes a valve body member having an upstream end, a downstream end, a bore extending therethrough and intersecting the ends thereof, a first annular shoulder intersecting the bore and extending radially inward therefrom adjacent the downstream end, and a second annular shoulder intersecting the bore and extending radially inward therefrom adjacent the upstream end. First and second bearing members are disposed within the bore of said valve body member intermediate the first and second annular shoulders and are axially slidably movable within the bore between the first and second annular shoulders. A valve member is disposed within the bore of said valve body member and includes first and second journal elements formed thereon, the first journal element being rotatably received in said first bearing member and the second journal element being rotatably received in said second bearing member, whereby said valve member is rotatably supported within the bore of said valve body member and is axially movable therein.

An object of the present invention is to provide an improved trunnion type valve wherein the trunnion bearing block structure is independent of the valve body, valve stem and endplates.

Another object of the present invention is to provide an improved trunnion type valve wherein the valve member seeks self-alignment within the valve body upon assembly of the valve.

A further object of the present invention is to provide an improved trunnion type valve having no rigid stem connection to the valve member thereby minimizing misalignment in service to reduce binding or bias of the valve stem and, therefore, the torque required to operate the valve.

Yet another object of the present invention is to provide an improved trunnion type valve wherein wear or dissipation of the trunnion bearing blocks will not affect the proper operation of the valve.

A still further object of the present invention is to provide an improved trunnion type valve requiring reduced dimensional control during manufacture and providing simplified assembly and improved service performance.

Other objects and advantages of the present invention will be evident from the following detailed description when read in conjunction with the accompanying drawings.

BRIEF DESCRIPTION OF THE DRAWINGS

FIG. 1 is a vertical cross-sectional view of a ball valve constructed in accordance with the present invention.

FIG. 2 is a cross-sectional view of the ball valve of FIG. 1 taken along line 2—2 of FIG. 1.

FIG. 3 is a vertical cross-sectional view of the ball valve of FIG. 1 illustrating the valve in the closed position.

FIG. 4 is a cross-sectional view of the ball valve of FIG. 3 taken along line 4—4 of FIG. 3.

FIG. 5 is a fragmentary vertical cross-sectional view of a portion of a ball valve constructed in accordance with the present invention illustrating another embodiment of bearing member.

FIG. 6 is a cross-sectional view similar to FIG. 2 illustrating another embodiment of valve constructed in accordance with the present invention.

FIG. 7 is a vertical cross-sectional view of another embodiment of ball valve constructed in accordance with the present invention.

DESCRIPTION OF THE PREFERRED EMBODIMENT

Referring now to the drawings, and to FIGS. 1, 2, 3 and 4 in particular, reference character 10 generally designates a valve constructed in accordance with the present invention. The valve 10 includes a valve body member 12 comprising a valve body 14, an upstream endplate 16 and a downstream endplate 18. An upstream end face 20 and a downstream end face 22 are formed, respectively, on the opposite ends of the valve body 14. A bore 24 extends through the valve body 14. A counterbore 26 is formed in the bore 24 intersecting the upstream end face 20. A counterbore 28 is formed in the opposite end of the bore 24 and intersects the downstream end face 22. The counterbores 26 and 28 form annular shoulders 30 and 32, respectively, in the valve body 14.

An annular shoulder 34 formed on the upstream endplate 16 engages the upstream end face 20 of the valve body 14. An inner extension 36 of the upstream endplate 16 extends into the bore 24 of the valve body 14. The cylindrically shaped periphery 37 of the inner extension 36 has an outside diameter sized to provide a sliding fit within the bore 24. An annular end face 38 is formed on the inner extension 36 normal to and intersecting the bore 24.

A radial flange portion 40 extends outward from the inner extension 36 and has an outside diameter sized to fit closely within the counterbore 26. An annular shoulder 42 innerconnects the outer periphery of the radial flange portion 40 and the periphery 37 of the inner extension 36. An O-ring 44 is sealingly disposed between the annular shoulders 42 and 30.

A bore 46 is formed in the upstream endplate 16. A counterbore 48 is formed in the bore 46 intersecting the annular end face 38 and forming an annular shoulder 50 in the upstream end plate 16.

An annular shoulder 52 formed on the downstream end plate 18 engages the downstream end face 22 of the valve body 14. An inner extension 54 of the downstream end plate 18 extends into the bore 24 of the valve body 14. The cylindrically shaped periphery 55 of the inner extension 54 has an outside diameter sized to provide a sliding fit within the bore 24. An annular end face 56 is formed on the inner extension 54 normal to and intersecting the bore 24.

A radial flange portion 58 extends outward from the inner extension 54 and has an outside diameter sized to fit closely within the counterbore 28. An annular shoulder 60 interconnects the outer periphery of the radial flange portion 58 and the periphery 55 of the inner extension 54. An O-ring 62 is sealingly disposed between the annular shoulders 60 and 32.

A bore 64 is formed in the downstream end plate 18. A counterbore 66 is formed in the bore 64 intersecting the annular end face 56 and forming an annular shoulder 68 in the downstream end plate 18.

The upstream end plate 16 includes an end face 70 which is in engagement with the inner face 72 of a standard pipe flange 74. The downstream end plate 18 includes an end face 76 which is in engagement with the inner face 78 of a standard pipe flange 80.

A plurality of bolts 82 extend through the flanges 74 and 80, respectively, and are provided with threaded nuts 84 which are threaded onto the bolts 82 to move the flanges 74 and 80 relatively toward each other.

A transverse bore 86 extends through the valve body 14 intersecting the bore 24. A counterbore 88 is formed in the bore 86 adjacent the intersection thereof with the bore 24 providing a planar surface 90 in the valve body 14.

A valve stem 92 extends through the bore 86 and includes a flange 94 formed on the inner portion 96 of the stem 92. The flange 94 is positioned within the counterbore 88 adjacent the planar surface 90 of the valve body 14. The flange 94 is separated from the planar surface 90 by a bearing washer 98 encircling the stem 92. The bearing washer 98 is preferably constructed of a relatively resilient material such as Teflon. An O-ring seal 100 is positioned in an annular groove 102 encircling the stem 92 and sealingly engages the stem 92 and the valve body 14 in the bore 86. The stem 92 is axially retained in the bore 86 by means of a spring retaining clip 104 disposed in an interrupted annular groove 106 formed in the upper portion 108 of the stem 92. A tongue 110 is formed on the inner end 96 of the stem 92 for purposes which will be described more fully hereinafter.

A valve ball 112 having a port 114 formed therein is disposed within the bore 24 of the valve body 14. A first journal member or trunnion 116 is formed on the upper portion 118 of the valve ball 112. A rectangular recess 120 is formed in the first journal member 116 and is sized to receive the tongue 110 formed on the valve stem 92. A second journal member or trunnion 122 is formed on the lower portion 124 of the valve ball 112.

The peripheral surface 126 and 128 of the journal members 116 and 122, respectively, are cylindrical in shape and coaxial with one another.

The first journal member 116 is journaled in a first bearing member 130. The first bearing member 130 is provided with a bore 132 sized to slidingly receive the peripheral surface 126 of the first journal member 116. An annular extension 134 is formed on the first bearing member 130 and extends downwardly into a mating annular recess 136 formed in the upper portion 118 of the valve ball 112. The annular extension 134 and the mating annular recess 136 encircle the first journal member 116.

The upper surface 138 of the first bearing member 130 is in the form of a portion of a cylinder and conforms to the inner periphery of the bore 24 in the valve body 14. It should be noted that in certain valve sizes it may be desirable for the upper surface 138 to be spherical in shape. End faces 140 and 142 are formed on the opposite ends of the first bearing member 130 adjacent the annular end faces 38 and 56, respectively. A longitudinal rectangular groove 144 is formed in the upper portion of the first bearing member 130 and is of sufficient width and depth to allow the first bearing member 130 to be inserted axially into the bore 24 of the valve body 14 while assembled on the valve ball 112 and with the valve stem 92 installed in the valve body 14. It should be noted that in order for the valve ball 112 and the first bearing member 130 journaled thereon to be so installed, the valve stem 92 and the valve ball 112 must each be placed in the closed valve position.

A counterbore 146 is formed in the upper end of the bore 132 and intersects the upper surface 138 of the first bearing member 130. The counterbore 146 extends to a depth equal to the depth of the groove 144.

The second journal member 122 is journaled in a second bearing member 148. The second bearing member 148 is provided with a bore 150 sized to slidingly receive the peripheral surface 128 of the second journal member 122. An annular extension 152 is formed on the second bearing member 148 and extends upwardly into a mating annular recess 154 formed in the lower portion 124 of the valve ball 112. The annular extension 152 and the mating annular recess 154 encircle the second journal member 122.

The lower surface 156 of the second bearing member 148 is in the form of a portion of a cylinder and conforms to the inner periphery of the bore 24 in the valve body 14. It should again be noted that in certain valve sizes it may be desirable for the lower surface 156 to be spherical in shape. End faces 158 and 160 are formed on the opposite ends of the second bearing member 148 adjacent the annular end faces 38 and 56, respectively.

It may be readily seen that the valve ball 112 with the first and second bearing members 130 and 148 journaled thereon may be inserted axially into the valve body 14 from either end of the bore 24 provided the respective end plate 16 or 18 is removed therefrom. As noted above, the valve stem 92 and the valve ball 112 must be placed in the closed valve position for correct assembly.

It should be noted that the longitudinal distance between the end faces 140 and 142 of the first bearing member 130 is less than the axial distance between the annular end face 38 of the upstream end plate 16 and the annular end face 56 of the downstream end plate 18. Similarly, the longitudinal distance between the end faces 158 and 160 of the second bearing member 148 is also less than the axial distance between the annular end face 38 of the upstream end plate 16 and the annular end face 56 of the downstream end plate 18.

It should also be noted that the counterbore 146 formed in the first bearing member 130 has a diameter greater than the diameter of the flange 94 formed on the inner portion 96 of the valve stem 92. It may be readily seen that the differences in these dimensions permits the first and second bearing members 130 and 148 to slide axially within the bore 24 of the valve body 14 within the limits of the confining annular end faces 38 and 56. The preferred amount of axial movement permitted the first and second bearing members 130 and 148 ranges between 0.001 inch and 0.012 inch, however, such movement need not necessarily be so limited.

The diameter of the counterbore 146 is of sufficient size to allow the first bearing member 130 to slide axially as described above without binding on the tongue 110 formed on the inner end 96 of the valve stem 92. As best illustrated in FIG. 2, the counterbore 146 cooperates with the outer portions 162 and 164 of the tongue 110 to radially position the valve ball 112 when in the open valve position.

Annular seat rings 166 and 168, preferably formed of metal, are disposed in the upstream end plate 16 and the downstream end plate 18, respectively.

The annular seat ring 166 has a first peripheral surface 170 and a second peripheral surface 172 formed thereon which are interconnected by an annular wall 174. The first peripheral surface 170 is slidably disposed within the bore 46 and the second peripheral surface 172 is slidably disposed in the counterbore 48. A biasing means 176, such as a Belleville spring, is disposed between the annular shoulder 50 of the end plate 16 and the annular wall 174 of the annular seat ring 166. The biasing means 176 urges the annular seat ring 166 toward the valve ball 112 to provide sealing engagement therewith. The annular seat ring 166 engages the valve ball 112 along a surface 178 formed thereon which conforms to the exterior of the valve ball 112. An elastic annular seal member 180 is disposed in the surface 178 to provide additional sealing between the seat ring 166 and the valve ball 112.

The annular seat ring 168 has a first peripheral surface 182 and a second peripheral surface 184 formed thereon, which are interconnected by an annular wall 186. The first peripheral surface 182 is slidably disposed within the bore 64 and the second peripheral surface 184 is slidably disposed in the counterbore 66. A biasing means 188, such as a Belleville spring, is disposed between the annular shoulder 68 of the end plate 18 and the annular wall 186 of the annular seat ring 168. The biasing means 188 urges the annular seat ring 168 toward the valve ball 112 to provide sealing engagement therewith. The annular seat ring 168 engages the valve ball 112 along a surface 190 formed thereon which conforms to the exterior of the valve ball 112. An elastic annular seal member 192 is disposed in the surface 190 to provide additional sealing between the seat ring 168 and the valve ball 112.

The biasing means 176 and 188 acting through the annular seat rings 166 and 168, respectively, cause the valve ball 112 and the first and second bearing members 130 and 148 to move into proper alignment within the bore 24 of the valve body 14.

OPERATION OF THE PREFERRED EMBODIMENT

As shown in FIGS. 3 and 4, when the flow through the valve 10 is from left to right, and the valve ball 112 is in the closed valve position, the valve ball 112 is formed by fluid pressure to move from left to right. The first and second bearing blocks 130 and 148 are axially displaced from left to right within the bore 24 of the valve body 14 until the respective end faces 142 and 160 thereof engage the annular end face 56 of the downstream end plate 18. At this point the valve ball 112 is prevented from moving further in the downstream direction by the first and second bearing members 130 and 148 in which the valve ball 112 is journaled. The annular seat ring 166 is retained in sealing engagement with the upstream side of the valve ball 112 through the urging of the biasing means 176. The annular seat ring 168 remains in sealing engagement with the downstream side of the valve ball 112 through the urging of the biasing means 188. As illustrated in FIG. 3, note that the end faces 142 and 160 of the bearing blocks 130 and 148, respectively, are sized such that they engage the end 56 of the downstream end plate 18 before the annular seat ring 168 reaches its limit of downstream travel within the end plate 18.

Upon the opening of the valve 10, the biasing means 188, acting through the annular seat ring 168, urges the valve ball 112 and the first and second bearing members 130 and 148 in the upstream direction until the valve ball 112 reaches a position of proper alignment between the annular seat rings 166 and 168 at which time the opposing forces of the biasing means 176 and 188 are balanced.

It should be noted that since the annular seat rings 166 and 168 are formed of metal, a metal to metal seal is provided which will not be destroyed in the event of a fire. It should also be noted that the pressure loading on the valve ball 112, when in the closed position, is carried by the first and second bearing members 130 and 148 and transmitted to the downstream end plate 18, thus greatly reducing the stress on the annular seat ring 168 to that imposed by the biasing means 188.

DESCRIPTION OF THE EMBODIMENT OF FIG. 5

FIG. 5 illustrates a valve ball 112, as described above, journaled in slightly modified first and second bearing members 130a and 148a. In the first bearing member 130a, a counterbore 194 is formed in the lower portion of the bore 132a and a cylindrical bearing sleeve 196, preferably formed of a synthetic resin material, such as Nylon, Delrin, or Teflon, is disposed therein encircling the first journal member 116 of the valve ball 112.

In the second bearing member 148a, a counterbore 198 is formed in the upper end portion of the bore 150a and a cylindrical bearing sleeve 200, preferably also formed of a synthetic resin material such as Nylon, Delrin or Teflon, is disposed therein encircling the second journal member 122 of the valve ball 112.

It should be noted that the cylindrical bearing sleeves 196 and 200 do not extend through the full length of the respective bores 132a and 150a, thereby assuring adequate metal to metal support of the valve ball 112 in the event of dissipation of the cylindrical bearing sleeves 196 and 200 due to the exposure of the valve to extreme heat as might be experienced in a fire.

DESCRIPTION OF THE EMBODIMENT OF FIG. 6

FIG. 6 illustrates another embodiment of the present invention in which the slightly modified valve 10b comprises many of the elements described above which will be designated by their previous reference characters. In the valve 10b, the first journal member 166 of the slightly modified valve ball 112b is journaled in a modified first bearing member 130b. The first bearing member 130b is provided with a bore 132b sized to slidingly receive the peripheral surface 126 of the first journal member 116. An annular extension 134 is formed on the lower portion of the first bearing member 130b and extends downwardly into a mating annular recess 136 formed on the upper portion 118 of the valve ball 112b. The annular extension 134 and the mating annular recess 136 encircle the first journal member 116. The upper surface 138a of the first bearing member 130b comprises two partial cylindrical portions 202 and 204 which conform to the inner periphery of the bore 24 in the valve body 14b, and a flat portion 206 which interconnects the cylindrical portions 202 and 204. The flat portion 206 is positioned below the tongue 110 of the valve stem 92.

The slightly modified second journal member 122b is journaled in a modified second bearing member 148b. The second bearing member 148b is provided with a bore 150b sized to slidingly receive the peripheral surface 128 of the second journal member 122b. An annular extension 152 is formed on the upper portion of the second bearing member 148b and extends upwardly into a mating annular recess 154 formed in the lower portion 124 of the valve ball 112b. The annular extension 152 and the mating annular recess 154 encircle the second journal member 122b.

The lower surface 156b of the second bearing member 148b comprises two partial cylindrical portions 208 and 210 which conform to the inner periphery of the bore 24 in the valve body 14b, and a flat portion 212 interconnecting the cylindrical portions 208 and 210.

A pin 214 extends upwardly through the lower portion of the valve body 14b to fit loosely within a blind hole 216 formed in the lower portion 124 of the valve ball 112b. The positioning of the pin 214 within the hole 216 provides proper radial alignment of the valve ball 112b within the bore 24 without restricting the longitudinal movement of the ball 112b within the bore 24.

DESCRIPTION OF THE EMBODIMENT OF FIG. 7

The vertical cross-sectional view of FIG. 7 illustrates another embodiment of self-aligning trunnion ball valve constructed in accordance with the present invention and generally designated by the reference character 10c. Many components of the valve 10c are identical to those previously described in connection with FIGS. 1, 2, 3 and 4 and will be designated by the same reference characters.

The valve 10c includes a modified valve body member 12c comprising an inlet portion 218 and an outlet portion 220. A bore 222 extends through the outlet portion 220. A first counterbore 224 is formed in the upstream end of the bore 222 forming an annular shoulder 226 therebetween. A second counterbore 228 is formed in the upstream end of the first counterbore 224 and forms a second annular shoulder 230 therebetween. A third counterbore 232 is formed in the upstream end of the second counterbore 228 and forms a third annular shoulder 234 therebetween. An annular end face 236 is formed on the upstream end of the outlet portion 220 and lies in a plane normal to the axis of the bore 222.

A bore 238 extends through the inlet portion 218 of the valve body member 12c. A first counterbore 240 is formed in the downstream end of the bore 238 and forms a first annular shoulder 242 therebetween. A second counterbore 244 is formed in the downstream end of the first counterbore 240 and forms a second annular shoulder 245 therebetween.

An inner extension 246 formed on the downstream end of the inlet portion 218 extends into the third counterbore 232 of the outlet portion 220. The cylindrically shaped periphery 247 of the inner extension 246 has an outside diameter sized to provide a sliding fit within the counterbore 232. An annular end face 248 is formed on the downstream end of the inner extension 246 normal to and intersecting the counterbore 232.

A radial flange portion 250 extends toward from the inner extension 246 and has an outside diameter sized to fit closely within a fourth counterbore 252 formed in the upstream end of the third counterbore 232 of the outlet portion 220. An annular shoulder 254 interconnects the counterbores 252 and 232. An annular shoulder 256 interconnects the outer periphery of the radial flange portion 250 and the periphery 247 of the inner extension 246. An O-ring 258 is sealingly disposed between the annular shoulders 254 and 256.

A second radial flange portion 260 extends radially outward from the radial flange portion 250. An end face 262 is formed on the downstream end of the flange portion 260 and engages the annular end face 236 of the outlet portion 220. A plurality of threaded bolts 264 extends through the flange portion 260 and threadedly engage the outlet portion 220 to retain the end faces 236 and 262 in rigid engagement.

A transverse bore 86 extends through the outlet portion 220 of the valve member 12c intersecting the counterbore 232. A counterbore 88 is formed in the bore 86 adjacent the intersection thereof with the counterbore 232 providing a planar surface 90 in the outlet portion 220.

A valve stem 92 extends through the bore 86 and includes a flange 94 formed on the inner portion 96 of the stem 92. The flange 94 is positioned within the counterbore 88 adjacent the planar surface 90. The flange 94 is separated from the planar surface 90 by a bearing washer 98 encircling the stem 92. The bearing washer 98 is preferably constructed of a relatively resilient material such as Teflon. An O-ring seal 100 is positioned in an annular groove 102 encircling the stem 92. The seal 100 sealingly engages both the stem 92 and the bore 86. The stem 92 is axially retained in the bore 86 by means of a spring retaining clip 104 disposed in an interrupted annular groove 106 formed in the upper portion 108 of the stem 92. A tongue 110 is formed on the inner end 96 of the stem 92 for purposes which will be described more fully hereinafter.

A valve ball 112 having a port 114 formed therein is disposed within the counterbore of the outlet portion 220 of the valve body member 12c. A first journal member or trunnion 116 is formed on the upper portion 118 of the valve ball 112. A rectangular recess 120 is formed in the first journal member 116 and is sized to receive the tongue 110 formed on the valve stem 92. A second journal member or trunnion 122 is formed on the lower portion 124 of the valve ball 112.

The peripheral surfaces 126 and 128 of the journal members 116 and 122, respectively, are cylindrical in shape and coaxial with one another.

The first journal member 116 is journaled in a first bearing member 130. The first bearing member 130 is provided with a bore 132 sized to slidingly receive the peripheral surface 126 of the first journal member 116. An annular extension 134 is formed on the first bearing member 130 and extends downwardly into a mating annular recess 136 formed in the upper portion 118 of the valve ball 112. The annular extension 134 and the mating annular recess 136 encircle the first journal member 116.

The upper surface 138 of the first bearing member 130 is in the form of a portion of a cylinder and conforms to the inner periphery of the counterbore 232 in the outlet portion 220 of the valve body member 12c. End faces 120 and 142 are formed on the opposite ends of the first bearing member 130 adjacent the annular end face 248 and the third annular shoulder 234, respectively. A longitudinal rectangular groove 144 is formed in the upper portion of the first bearing member 130 and is of sufficient width and depth to allow the first bearing member 130 to be inserted axially into the upstream end of the counterbore 232 while assembled on the valve ball 112 and with the valve stem 92 installed in the outlet portion 220. It should be noted that in order for the valve ball 112 and the first bearing member 130 journaled thereon to be so installed, the valve stem 92 and the valve ball 112 must each be placed in the closed valve position.

A counterbore 146 is formed in the upper end of the bore 132 and intersects the upper surface 138 of the first bearing member 130. The counterbore 146 extends to a depth equal to the depth of the groove 144.

The second journal member 122 is journaled in a second bearing member 148. The second bearing member 148 is provided with a bore 150 sized to slidingly receive the peripheral surface 128 of the second journal member 122. An annular extension 152 is formed on the second bearing member 148 and extends upwardly into a mating annular recess 154 formed in the lower portion 124 of the valve ball 112. The annular extension 152 and the mating annular recess 154 encircle the second journal member 122.

The lower surface 156 of the second bearing member 148 is in the form of a portion of a cylinder and conforms to the inner periphery of the counterbore 232. End faces 158 and 160 are formed on the opposite ends of the second bearing member 148 adjacent the annular end face 248 and the third annular shoulder 234, respectively.

It may be readily seen that the valve ball 112 with the first and second bearing members 130 and 148 journaled thereon may be inserted axially into the upstream end of the counterbore 232 provided the inlet portion 218 of the valve body member 12c is separated therefrom. As noted above, the valve stem 92 and the valve ball 112 must each be placed in the closed valve position for correct assembly.

It should be noted that the longitudinal distance between the end faces 140 and 142 of the first bearing member 130 is less than the axial distance between the annular end face 248 of the inlet portion 218 and the third annular shoulder 234 of the outlet portion 220. Similarly, the longitudinal distance between the end faces 158 and 160 of the second bearing member 148 is also less than the axial distance between the annular end face 248 of the inlet portion 218 and the third annular shoulder 234 of the outlet portion 220.

It should also be noted that the counterbore 146 formed in the first bearing member 130 has a diameter greater than the diameter of the flange 94 formed on the inner portion 96 of the valve stem 92. It may be readily seen that the differences in these dimensions permits the first and second bearing members 130 and 148 to slide axially within the counterbore 232 of the outlet portion 220 of the valve body member 12c within the limits of the confining annular end face 248 and third annular shoulder 234. The preferred amount of axial movement permitted the first and second bearing members 130 and 148 ranges between 0.001 inch and 0.012 inch, however, such movement need not necessarily be so limited.

The diameter of the counterbore 146 is of sufficient size to allow the first bearing member 130 to slide axially as described above without binding on the tongue 110 formed on the inner end 96 of the valve stem 92.

Annular seat rings 166 and 168 are disposed in the inlet portion 218 and the outlet portion 220, respectively, of the valve body member 12c.

The annular seat ring 166 has a first peripheral surface 170 and a second peripheral surface 172 formed thereon which are interconnected by an annular wall 174. The first peripheral surface 170 is slidably disposed within the first counterbore 240 and the second peripheral surface 172 is slidably disposed within the second counterbore 244. A biasing means 176, such as a Belleville spring, is disposed between the second annular shoulder 245 of the inlet portion 218 and the annular wall 174 of the annular seat ring 166. The biasing means 176 urges the annular seat ring 166 toward the valve ball 112 to provide sealing engagement therewith. The annular seat ring 166 engages the valve ball 112 along a surface 178 formed thereon which conforms to the exterior of the valve ball 112. An elastic annular seal member 180 is disposed in the surface 178 to provide additional sealing between the seat ring 176 and the valve ball 112.

The annular seat ring 168 has a first peripheral surface 182 and a second peripheral surface 184 formed thereon, which are interconnected by an annular wall 186. The first peripheral surface 182 is slidably disposed within the first counterbore 224 and the second peripheral surface 184 is slidably disposed within the second counterbore 228 of the outlet portion 220 of the valve body member 12c. Biasing means 188, such as a Belleville spring, are disposed between the annular shoulder 230 of the outlet portion 220 of the valve body member 12c and the annular wall 186 of the annular seat ring 168. The biasing means 188 urges the annular seat ring 168 toward the valve ball 112 to provide sealing engagement therewith. The annular seat ring 168 engages the valve ball 112 along a surface 190 formed thereon which conforms to the exterior of the valve ball 112. An elastic annular seal member 192 is disposed in the surface 190 to provide additional sealing between the seat ring 168 and the valve ball 112.

The biasing means 176 and 188 acting through the annular seat rings 166 and 168, respectively, cause the valve ball 112 and the first and second bearing members 130 and 148 to move into proper alignment within the counterbore 232 of the outlet portion 220 of the valve body member 12c.

The operation of the embodiment of FIG. 7 is substantially identical to that described for the preferred embodiment and, therefore, need not be described in detail again.

From the foregoing detailed description of the various embodiments of self-aligning trunnion ball valves, it can be readily seen that the present invention provides an improved trunnion type valve in which the trunnion bearing block structure is independent of the valve body, valve stem, and end plates. It may further be readily seen that a valve constructed in accordance with the present invention provides minimum misalignment in service thereby reducing binding or bias of the valve stem and, therefore, the torque required to operate the valve.

Changes may be made in the construction and arrangement of parts or elements of the various embodiments as disclosed herein without departing from the spirit and scope of the invention.

What is claimed is:

1. A valve comprising:
   a valve body member having an upstream end and a downstream end, a bore formed therein, and having a valve chamber formed therein intermediate the upstream and downstream ends;
   a valve member movable disposed within the valve chamber of said valve body member and having a first journal element and a second journal element formed thereon, said valve member being movable between a position opening the bore and a position closing the bore;
   a first bearing member slidably disposed in the valve chamber and rotatably receiving the first journal element of said valve member and being axially movable along the periphery of the valve chamber;
   a second bearing member slidably disposed in the valve chamber and rotatably receiving the second journal element of said valve member and being axially movable along the periphery of the valve chamber; and
   an annular seal carried in said valve body member adjacent the downstream end thereof and encircling the bore formed therein, said annular seal having a surface thereof sealingly engaging said valve member.

2. A valve as defined in claim 1 characterized further to include:
   an annular seal carried in said valve body member adjacent the upstream end thereof and encircling the bore formed therein, said annular seal having a surface thereof sealingly engaging said valve member.

3. A valve as defined in claim 1 characterized further to include:
   a downstream annular shoulder formed within said valve body member and intersecting the periphery of the valve chamber to limit the axial movement of said first and second bearing members in the downstream direction; and
   an upstream annular shoulder formed within said valve body member intersecting the periphery of the valve chamber to limit the axial movement of said first and second bearing members in the upstream direction.

4. A valve as defined in claim 1 characterized further to include:
   a valve stem extending through said valve body member and operatingly connected at the inner end thereof to the first journal element for moving said valve member between a position opening the bore and a position closing the bore.

5. A valve as defined in claim 4 wherein the connection between said valve stem and the first journal element comprises:
   a tongue formed on the inner end of said valve stem; and
   a recess formed on the first journal element and nonrotatably receiving said tongue; and
   wherein said first bearing member is characterized further to include:
   a longitudinal groove formed therein adjacent the periphery of the valve chamber, said longitudinal groove being sized to allow passage of said tongue therethrough so that said first and second bearing members may be axially inserted into the valve chamber with said valve member rotatably supported therebetween and with said valve stem installed in said valve body member.

6. In a valve of the type which comprises:
a valve body member having an upstream end and a downstream end, a bore formed therein, and having a substantially cylindrically shaped valve chamber with a diameter greater than the bore and substantially coaxial therewith formed therein intermediate the upstream and downstream ends;
a valve member movably disposed within the valve chamber of said valve body member and having a first journal element and a second journal element formed thereon, said valve member being movable between a position opening the bore and a position closing the bore, the improvement comprising:
a first bearing member slidably disposed in the valve chamber and rotatably receiving the first journal element of said valve member and being axially movable along the periphery of the valve chamber; and
a second bearing member slidably disposed in the valve chamber and rotatably receiving the second journal element of said valve member and being axially movable along the periphery of the valve chamber.

7. A valve as defined in claim 6 characterized further to include:
an annular seal carried in said valve body member adjacent the downstream end thereof and encircling the bore formed therein, said annular seal having a surface thereof sealingly engaging said valve member.

8. A valve as defined in claim 7 characterized further to include:
a downstream annular shoulder formed within said valve body member and intersecting the periphery of the valve chamber to limit the axial movement of said first and second bearing members in the downstream direction; and
an upstream annular shoulder formed within said valve body member and intersecting the periphery of the valve chamber to limit the axial movement of said first and second bearing members in the upstream direction.

9. A valve as defined in claim 8 characterized further to include:
an annular seal carried in said valve body member adjacent the upstream end thereof and encircling the bore formed therein, said annular seal having a surface thereof sealingly engaging said valve member.

10. A valve comprising:
a valve body member having an upstream end, a downstream end, a bore extending therethrough and intersecting the ends thereof, a first annular shoulder intersecting the bore and extending radially inward therefrom adjacent the downstream end, and a second annular shoulder intersecting the bore and extending radially inward therefrom adjacent the upstream end;
a first bearing member disposed within the bore of said valve body member intermediate the first and second annular shoulders and being axially slidably movable within the bore between the first and second annular shoulders;
a second bearing member disposed within the bore of said valve body member intermediate the first and second annular shoulders and being axially slidably movable within said bore between the first and second annular shoulders; and
a valve member disposed within the bore of said valve body member and having first and second journal elements formed thereon, the first journal element being rotatably received in said first bearing member and the second journal element being rotatably received in said second bearing member, whereby said valve member is rotatably supported within the bore of said valve body member and is axially movable therein.

11. A valve as defined in claim 10 characterized further to include:
a first annular seal axially movably carried in said valve body member adjacent the downstream end thereof and concentric with the bore extending therethrough, said first annular seal having a surface thereof sealingly engaging said valve member.

12. A valve as defined in claim 11 characterized further to include:
a second annular seal axially movably carried in said valve body member adjacent the upstream end thereof and concentric with the bore extending therethrough, said second annular seal having a surface thereof sealingly engaging said valve member.

13. A valve as defined in claim 12 characterized further to include:
first biasing means for biasing said first annular seal axially toward said valve member; and
second biasing means for biasing said second annular seal axially toward said valve member.

14. A valve as defined in claim 13 characterized further to include:
a valve stem extending through said valve body member and connected at the inner end thereof to the first journal element formed on said valve member for turning said valve member between a position wherein the valve is open and a position wherein the valve is closed; and
wherein said first and second biasing means urge said valve member into alignment with said valve stem when said valve member is in the position wherein the valve is open.

15. A valve as defined in claim 14 wherein said first and second bearing members are sized to limit the axial downstream movement of said valve member within said valve body member by engaging the first annular shoulder of said valve body member before said first annular seal reaches its maximum axial downstream travel within said valve body member.

16. A valve as defined in claim 15 wherein the inner end of said valve stem is rotatably received in said first bearing member thereby preventing rotation of said valve member about the axis of the bore through said valve body member.

17. A valve as defined in claim 15 characterized further to include:
means for preventing rotation of said valve member about the axis of the bore through said valve body member.

* * * * *